United States Patent [19]

Chao

[11] 3,740,745

[45] June 19, 1973

[54] RING CORE KEYBOARD ENTRY DEVICE

[75] Inventor: Stanley K. Chao, Lexington, Mass.

[73] Assignee: Data Electronics Corporation, Burlington, Mass.

[22] Filed: Jan. 14, 1972

[21] Appl. No.: 217,923

Related U.S. Application Data

[63] Continuation-in-part of Ser. No. 76,189, Sept. 28, 1970, Pat. No. 3,688,307.

[52] U.S. Cl. ............ 340/365 E, 197/98, 340/365 L

[51] Int. Cl. ............................................ H04q 3/100

[58] Field of Search ......................... 340/365, 166 C

[56] References Cited

UNITED STATES PATENTS

| | | | |
|---|---|---|---|
| 3,573,807 | 4/1971 | Osborne | 340/365 |
| 3,500,336 | 3/1970 | Cuccio | 340/172.5 |

*Primary Examiner*—John W. Caldwell
*Assistant Examiner*—Robert J. Mooney
*Attorney*—Robert J. Schiller and Nichalas A. Pandiscio

[57] ABSTRACT

A keyboard entry device has ring transformer cores each core having a different combination of electrically conductive input lines threaded therethrough. Each input line is connected to a switch and a capacitor. Each input line is connected to a switch and a capacitor, the capacitor storing charge from a D. C. supply. When the switch is activated a current pulse is transmitted over the input lines as a result of the capacitor being discharged. An output signal will be provided in the secondary windings of the cores in which the pulse is transmitted through. Registers, utilized for temporarily storing output signals from the secondary windings, as well as a unique N-key rollover feature are provided.

6 Claims, 5 Drawing Figures

RING CORE KEYBOARD ENTRY DEVICE

This application is a continuation-in-part of copending application Ser. No. 76,189 filed Sept. 28, 1970, now Letters Pat. No. 3,688,307, issued Aug. 29, 1972.

This invention relates to keyboard entry devices and more particularly to the techniques of using ring cores in keyboard types of devices, and to a ring core keyboard entry device.

A keyboard in the digital data processing and communications fields serves as an interface between the human operator and many types of electronic equipment including computers, displays, and other electronic as well as electro-mechanical instruments. A typical keyboard entry device consists of four basic elements: the key assembly, the encoder, the information control and the information storage, all driven, of course, from a power source of some type.

There are a number of different keyboard entry devices which have been used in the prior art. One type employs a purely electro-mechanical system using mechanical switches and springs with the major disadvantage that the reliability of the device is low primarily due to wear of the elements. Another type of keyboard entry devices includes the use of reed-relays. Although the reed-relay system represents an improvement over the use of mechanical switches and springs, the cost of reed-relays is relatively high and reliability is still a problem. The encoding system, generally a diode matrix, which is usually employed with either mechanical switches or reed-relay is not only costly, but has a questionable level of reliability due to the large number of elements required in the matrix.

Still another approach is a system having photoelectric switching elements. While this system reduces the number of electro-mechanical linkages employed, other problems result from low reliability of the light source and from high cost of electronic amplifiers. "Hall Effect" code generation which is used in yet another entry device is extremely costly because of the requirement for a separate code generator for each key. It also requires the ability to detect and amplify very low and temperature-variable signal outputs from the generators. The capacitive coupling approach uses the effect of capacitive variation as a result of key movement, and mechanical encoding of the key output. Such a system requires a separate set of capacitive circuits for each key and also suffers from the requirement to detect and amplify low and temperature-variable signals. Another approach utilizes a separate magnetic core and related amplification circuitry for each key which again is an expensive system. Such magnetic core systems have been utilized in electrical code translators.

An object of the present invention is to provide a keyboard entry device in which the foregoing disadvantages of the prior art are overcome by providing a reliable, easily operable, and economical unit. This object as well as others are accomplished by providing a keyboard entry device comprising a plurality of switching means adapted to be coupled to a source of power and a plurality of ring or transformer cores. A first plurality of electrically conductive means are provided, each being selectively threaded through a unique combination of cores and being connected to a corresponding one of the switching means so as to be connectable by the latter to the power source. Second separate electrically conductive means are coupled to each one of the cores so that upon actuation of any one of the switching means, an output signal is generated in corresponding second conductive means dependent upon the unique combination of cores which are threaded by the one of the first plurality of electrically conductive means connected to the actuated switching means.

The ring core keyboard entry device of the present invention has a number of unique characteristics and features. The ring cores may be either open, closed or split and may be of a wide variety of sizes and shapes. Since the output is a function of the magnitude of the input and the turns ratio between the first and second electrically conductive means, with a sufficient turns ratio, amplification of the output may be unnecessary, thereby reducing the cost of the device and enhancing its reliability. The first plurality of electrically conductive means may be simply wires which provide direct ground connections for the keys or switching means.

The basic ring core encoding technique is flexible and can be used in conjunction with different types of power sources, including direct current power supply, charging or discharging of energy source stored in capacitors, square wave power signal, and sinusoidal power source. The basic encoding technique can also be used with any one of many keys or switching means such as spring contact, reed contact, magnetic proximity switch, and capacitive coupling switches. When the power source used is of the continuously varying signal type, such as square wave and sinusoidal, and when used in conjunction with any of the key or switching means stated above, a sinusoidal or square wave signal at the input encoder will provide a continuous and similar sinusoidal or square wave signal at the output of the encoder. The output signal may then be detected by half or full wave rectifiers and the detected output levels will remain high as long as the key is depressed, eliminating the need for data latching or storage. A separate ring core may be used to detect the simultaneous or contemporaneous depressions of two or more keys and the output of the core used to lock the present device to either disable data or strobe outputs and/or signal an error condition.

Specifically, such use provides a two-key rollover feature wherein when a first key is actuated, a code signal for the first key will be generated and transmitted. If a second key should also be depressed before the first key is released, an error signal will be generated, the error signal being used to block simultaneous transmission of the two code signal. The second code signal will be transmitted only after release of the first key and while, of course, the second key is depressed.

This two-key rollover feature, which is usually required in keyboard types of devices in order to allow rapid typing without error, is easily implemented through the ring core encoder.

The majority of keyboard applications appear to call for only a two-key rollover feature. However, when a keyboard is used by touch typists who are used to operating a high speed electric keyboard such as is found in the selectric brand of typewriter manufactured by IMB Corporation, engineering studies indicate that a more than two or N-key rollover feature has advantages. The present invention permits implementation of an N-key rollover feature at essentially the same cost as a two-key system.

Basically, the N-key rollover feature in the present invention is based upon generation and transmission of a code immediately upon depression of a key without requiring that a previously depressed key be released. Generally this is accomplished by generating the code as a number of simultaneous short term pulses, storing the information in a register, transferring the information to a second register while inhibiting the storage of any additional information in the first register, all storage and information transfer being accomplished in a very short time.

The device of the present invention has no fixed mechanical linkage, there is no required specific alignment and the keys may be remotely located from the encoders and other electronic circuits. Since the device employs a limited number of ring cores and since the output of the ring core is large enough to enable direct coupling, the device of the present invention is extremely reliable and relatively inexpensive.

In addition to the basic encoding function, ring cores can also be used to perform such basic logical functions as "AND," "OR," "EXCLUSIVE OR," "ANYONE," AND "TWO OR MORE." Specifically utilized in the typical keyboard entry device described herein, the logical function, "ANYONE," is used to generate the strobe signal and the logical function, "TWO OR MORE," is used to generate an error signal which can be used in a 2-key rollover control.

Other objects of the invention will, in part, be obvious and will, in part, appear hereinafter. The invention accordingly comprises the apparatus possessing the construction, combination of elements, and arrangement of parts which are exemplified in the following detailed disclosure, and the scope of the application of which will be indicated in the claims:

Figure 1:
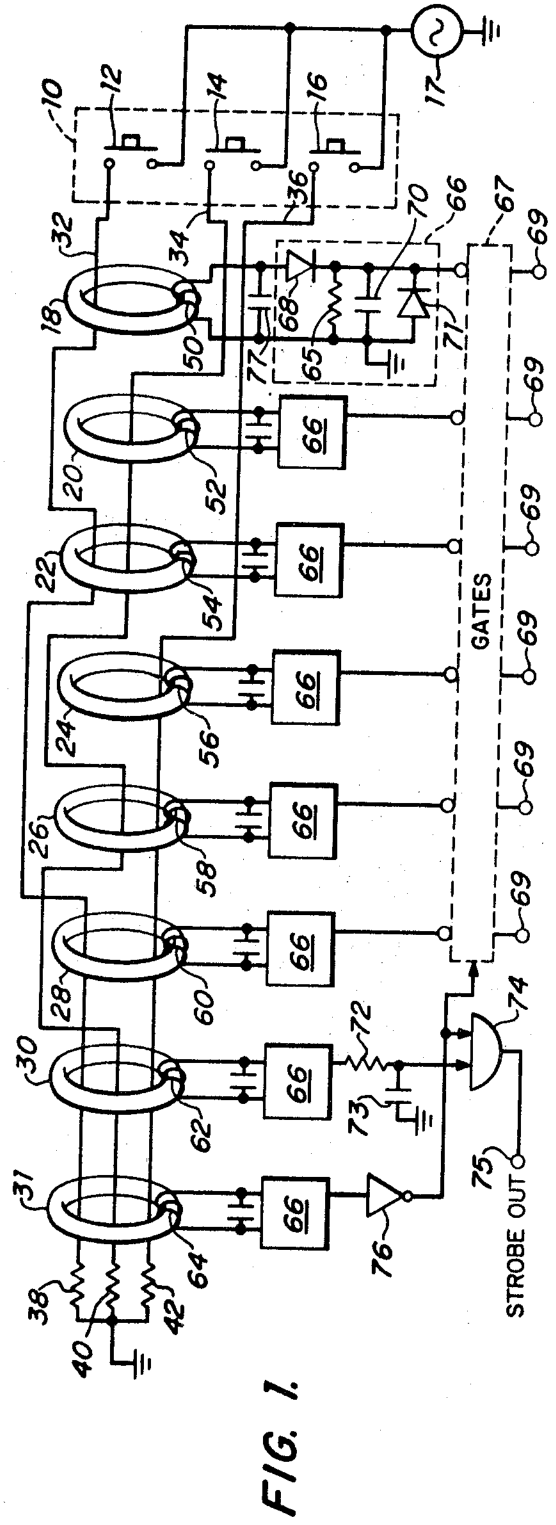
FIG. 1 is a schematic diagram of a basic keyboard entry device embodying the present invention.

Referring now to FIG. 1, there is shown a version of the present invention which includes a switch array or keyboard 10. The latter, for the sake of simplicity, is shown as a keyboard of only three keys 12, 14, and 16, although it will be apparent that the present invention may be utilized in a keyboard having any numbers of keys. The key used may be any one of a number of well known types of switching means, which, upon actuation, closes an electrical circuit. For example, the keys or switching means could be implemented by a switch contact either of the spring or magnetic reed version. One side of keyboard 10 is connected to power source 17, which is the form shown, and provides a sinusoidal a-c, typically at 150 KHz. Power source 17 is thus connected to one side of each of keys 12, 14, and 16.

A plurality of ring or transformer cores 18, 20, 22, 24, 26, and 28 are provided to serve as the encoding elements and as the interface between the mechanical keys and the electronic circuitry to be described. Obviously, the number of cores used depends on the code desired. The cores preferably are made of a material which has a relatively linear hysteresis characteristic. Although the cores are shown as the closed variety, they may also be either the open CI, open CC, open EE, or EI combinations, or split types. An open core is one made of two parts; for example, in a CI core, one part is in the shape of the letter C and the and the other in the shape of the letter I. Once the wires have been laid in the C portion the two parts are brought together to close the core. The open EI combination is quite similar, except that one of the parts is in the shape of the letter E. Open and split cores are useful because of the greater ease in wiring than in the case of a closed core. Two additional cores, 30 and 31, are also provided not for encoding purposes, but for ancillary functions of strobe pulse generation and to provide a disable output as will be seen later.

The other side of each of keys 12, 14, and 16, are coupled respectively to electrically conductive means such as lead wires 32, 34, and 36. Wires 32, 34 and 36 are selectively threaded through the ring cores such that each wire passes through a unique combination of cores. The exact threading arrangement depends on the encoding requires. In the embodiment shown, wire 32 is threaded through cores 18, 22, 28, 30, and 31, but is not threaded through cores 20, 24, and 26. Wire 34 is threaded through cores 20, 22, 26, 30 and 31, but is not threaded through cores 18, 24 and 28. Wire 36 is threaded through cores 24, 26, 28, 30 and 31, but is not threaded through cores 18, 20, and 22.

All three wires 32, 34, and 36, pass through a ring, cores 30 and 31; core 30 is used to detect the depression of any and all key switches and provide a strobe signal. Core 31 is used to detect the simultaneous depression of two or more keys. The output of core 31 can be used to disable strobe signaling, to disable data output, and/or to signal an error condition which will be described with the operation of the device. After passing through core 31, all the wires 32, 34, and 36 are connected through respective load resistors 38, 40, and 42 to ground.

Each of the ring cores 18, 20, 22, 24, 26, 28, 30, and 31 have second separate electrically conductive means in the form of respective secondary windings 50, 52, 54, 56, 58, 60, 62, and 64 wound thereabout. Each of the secondary windings except winding 64 may have any desired number of turns, although all preferably have the same number, and preferably the turns ratio between the secondary windings and the wires 32, 34 and 36 are selected such that there are sufficient turns on the secondary to generate an output suitable to drive the electronic circuits without amplification. In order to give the logical effect of two or more, the number of turns for winding 64 is one-half of the number of turns on any of the other windings. Thus, only one-half as much signal is generated when only one key is depressed. When two or more keys are depressed, a full output will be generated. With this arrangement each core serves as a transformer, the primary winding of which is the corresponding wire connected to the depressed key, and the secondary winding of which is used to generate the output signal. The secondary winding of all the cores are each connected at one end to a corresponding half wave rectifier circuit 66 for each core, which detects the sinusoidal signals and converts them into logical levels. These logical levels could be fed directly to an external device or fed through optional gate 67 to data output terminal 69. A typical circuit 66 is formed by grounding one side of winding 50 and placing paralleled resistor 65, capacitor 70 and diode 71 across winding 50. Another diode 68 is placed in series between the high side of winding 50 and the common connection for resistor 65 and capacitor 70.

The output line from rectifier 66 connected to strobe core output winding 62 and is provided with a time delay circuit formed of series resistor 72 and shunt capacitor 73. The output of this time delay circuit is connected to gate 74. The strobe signal from the output of gate 74 at terminal 75 will signify to the external circuit that data is available from the keyboard device. Core 31, which generates the error signal has its output winding 64 giving a signal through rectifier 66 and then detector circuit 76. As indicated before, winding 64 has half as many turns as the other windings; thus, only half as much voltage value is fed into circuit 76, which may be of any well known design and is a threshold circuit.

The threshold value of circuit 76 is chosen such that simultaneous depression of two or more of the keys will cause the threshold value to be exceeded producing an inhibit signal from circuit 76. The output of circuit 76 is used both to inhibit strobe signal through gate 74 and to hold data signal at zero through gate 67.

In the operation of the device in FIG. 1, depression of, for example, key 12 energizes cores 18, 22, 28, 30, and 31 to create an output from each core which is fed through corresponding rectifier from the corresponding secondary windings 50, 54, 60, 62, and 64.

If two or more of the keys are simultaneously depressed, an output signal of sufficient value is applied to threshold circuit 76, which provides an output signal which block both strobe signal and data lines. Upon release of all keys and the next depression of a single key, the signals from the respective secondary windings are again fed through to output terminals.

The above described sequence of operation is a typical case where the keyboard is operated as a real time device. The external equipment, such as a central computer or other control logic, must be ready to receive the information as soon as and as long as the keyboard is operated. In other cases, however, the operation of the keyboard can be used in a "lock step" fashion. The lock-step operation, when a key is depressed, is such that information becomes available and a signal is sent to the central computer or external logic signifying data is available. The data output from the keyboard must be held until an acknowledged signal is received from the central computer. In this case, the strobe signal indicated here will not be generated by the keyboard, but instead by the central computer and it is not necessary then to provide the device with core 30.

"Strobing" or timing indications that a signal is present due to depression of a key is provided by the output of gate 74. It should be noted that the strobe signal generated by core 30 and rectified by corresponding rectifier 66 is delayed by the time delay provided by resistor 72 and capacitor 73.

The optimum frequency for the input a-c from source 17 is selected in the region of about 150 KHz to 200 KHz because somewhere at higher frequencies the core losses becomes excessive and at somewhat lower frequencies the device requires an undesirably large number of turns on the secondary winding to be efficient.

Ordinarily, in a group of cores, one finds that the permeability at room temperature will typically vary as much as, for example, 20 percent from core to core. Additionally, electrical characteristics, such as permeability, of cores are usually quite temperature-variable. Hence, in the present system as exemplified by FIG. 1, improved system performance is realized by tuning; i.e., the secondary windings (such as 50 on core 18) are resonated at the frequency of source 17 by small capacitors 77. The increase in output over a nonresonant transformer secondary circuit and the broadness of the frequency range over which an increased output is available depend upon the loading of the resonant circuit: the ratio of the circuit impedance to the loading impedance or "Q."

Considerations of production tolerances, temperature coefficients of components, required temperature range and the like dictate a low Q (on the order of 1.5 to 2.0).

This can result in an over-all output voltage increase of about 6 db relative to the untuned circuit or one-fourth the drive power for equivalent voltage output.

If some care is taken in the selection of cores, and identical resonants circuits are used in the oscillator tank and core outputs, a temperature range of −20° C. to +85° C. can be accommodated with only moderate fall-off in performance at the extremes in spite of a 30 percent change in frequency over that range of temperature, and one can readily establish unambiguous logic levels for the core outputs despite variations in permeability from core to core.

Figure 2:
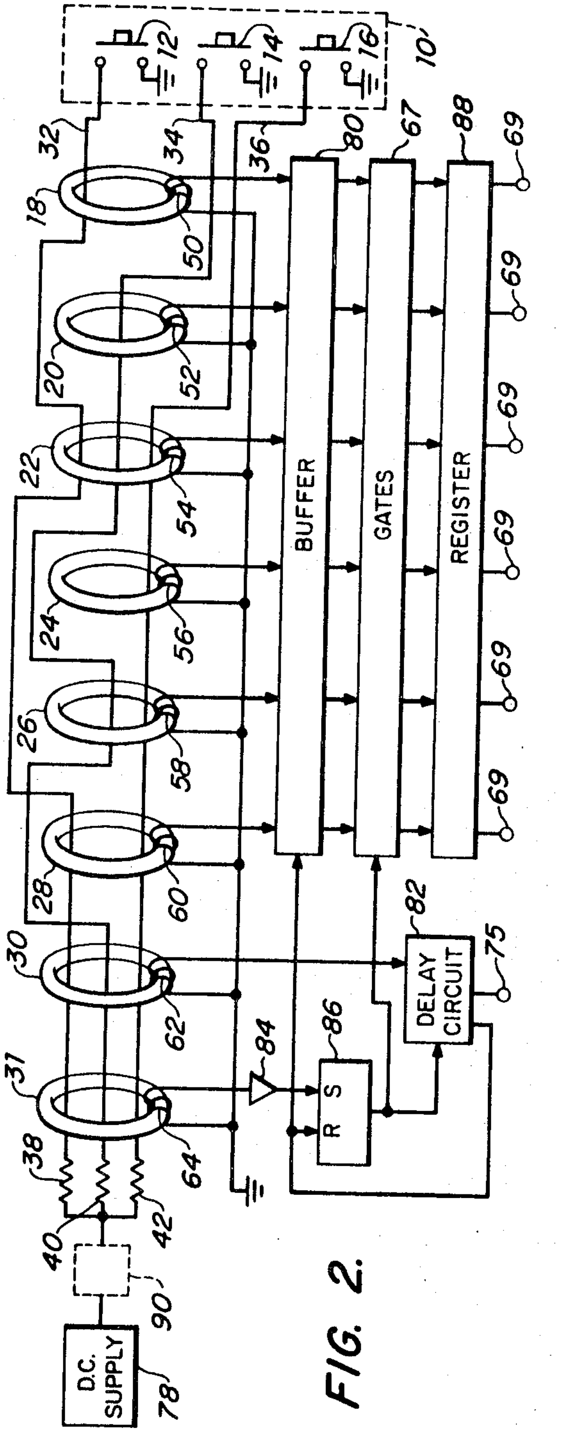
FIG. 2 is a schematic diagram of another version of a keyboard entry device embodying the present invention.

A different implementation of the basic device is illustrated in FIG. 2. In this case, instead of an a-c power source, a direct current power supply 78 is utilized. Power supply 78 could be a direct current voltage source or a capacitor which is either fully charged or completely discharged prior to the operation of key switches. There is provided keyboard 10 in which, instead of being mutually connected directly to a power supply, all of the switches 12, 14 and 16 have one side connected to ground. The device also includes lines 32, 34, and 36, which are connected to switches 12, 14, and 16, respectively as in FIG. 1, and threaded through cores having secondary windings in the same manner as the device of FIG. 1. However, instead of being connected to rectifiers, each of the secondary windings has one side connected to a common ground and the other side of windings 50, 52, 54, 56, 58, and 60, is fed into buffer storage 80.

The other side of winding 62 is connected to the input of a time delay circuit 82 to provide a delayed strobe pulse at output terminal 75.

The other side of winding 64 is connected through threshold amplifier 84 to the set input terminal of a bistable device such as flip-flop 86. The output of the latter is intended to provide inhibit signals and is connected to inhibit operation of delay circuit 82 so that the latter provides then no output signal.

The data output terminals of buffer 80 are selectively coupled through gates 67 to data register 88. The outputs of the latter are apparent at data terminals 69. The operation of gates 67 can also be inhibited inasmuch as the gates are also connected to the output of flip-flop 86. Lately, the output from circuit 82 is connected to both the reset terminal of flip-flop 86 and to enable transfer of data from buffer storage 80 to gate 67.

As an optional item, network 90 can be inserted between power supply 78 and load resistors 38, 40 and 42. One desirable function of network 90 would be to disconnect power supply 78 right after a switch is depressed but before the data is transferred out of buffer 80 and register 88. This optical network may be desirable in the case where the operation of the keyboard device is "lock-stepped" with a central computer.

In operation, the device of FIG. 2 operates quite similarly to that of FIG. 1. However, when any of key switches 12, 14, or 16 in keyboard 10 is depressed, a pulse is generated at each of the appropriate secondary windings of the transformer cores. Since the signals generated on these secondary windings are pulses, it is necessary to store them in a buffer such as 80. As noted, the output of flip-flop 86 is used to inhibit terminals of gate 67 thus preventing transfer of erroneous data into output register 88. The strobe signal generated through winding 62 upon depressing any of the key switches 12, 14, and 16, is delayed by circuit 82 before transmission, for example, to central computer. If an error is detected by core 31, the strobe signal will be inhibited by the output of flip-flop 86 as applied to circuit 82.

Figure 3:
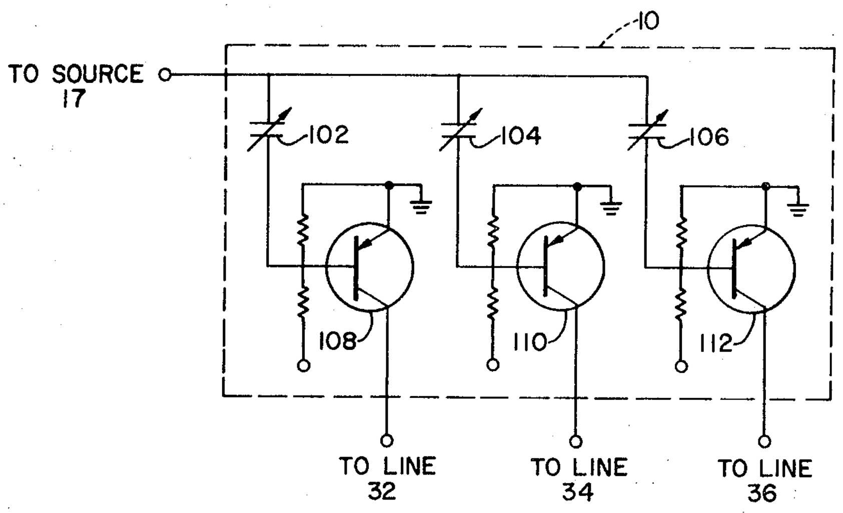
FIG. 3 is a circuit diagram of an alternative form of keyboard switches that are useful in an alternative version of the embodiment of FIG. 1.

Still another implementation of the keyboard entry device embodying the present invention is shown in FIG. 3 wherein there is shown a different form of keyboard 10 for use with the remainder of the circuit of FIG. 1. Keyboard 10 of FIG. 3 differs in that switches 12, 14, and 16 of FIG. 1 are replaced by switches 102, 104, and 106 which are of the known capacitive coupling type. Depressing of a capacitive coupling switch such as 102 will change the impedance level of the capacitive gap in the switch. Amplifier circuits 108, 110, and 112 connect immediately to capacitive switches 102, 104, and 106. Output of these amplifiers are respectively connected to the primary windings 32, 34, and 36 of the ring cores as shown. Amplifiers 108, 110, and 112 can be eliminated if the change of capacity before and after a given key is depressed is large enough so as to allow adequate signal-to-noise ratios at the secondary windings of the cores. The embodiment FIG. 3 illustrates a system which can be a complete solid state implementation of the present invention. Theoretically, a solid-state implementation of the keyboard should give better keyboard reliability since current is not interrupted through metal contacts in the key switches.

Figure 4:
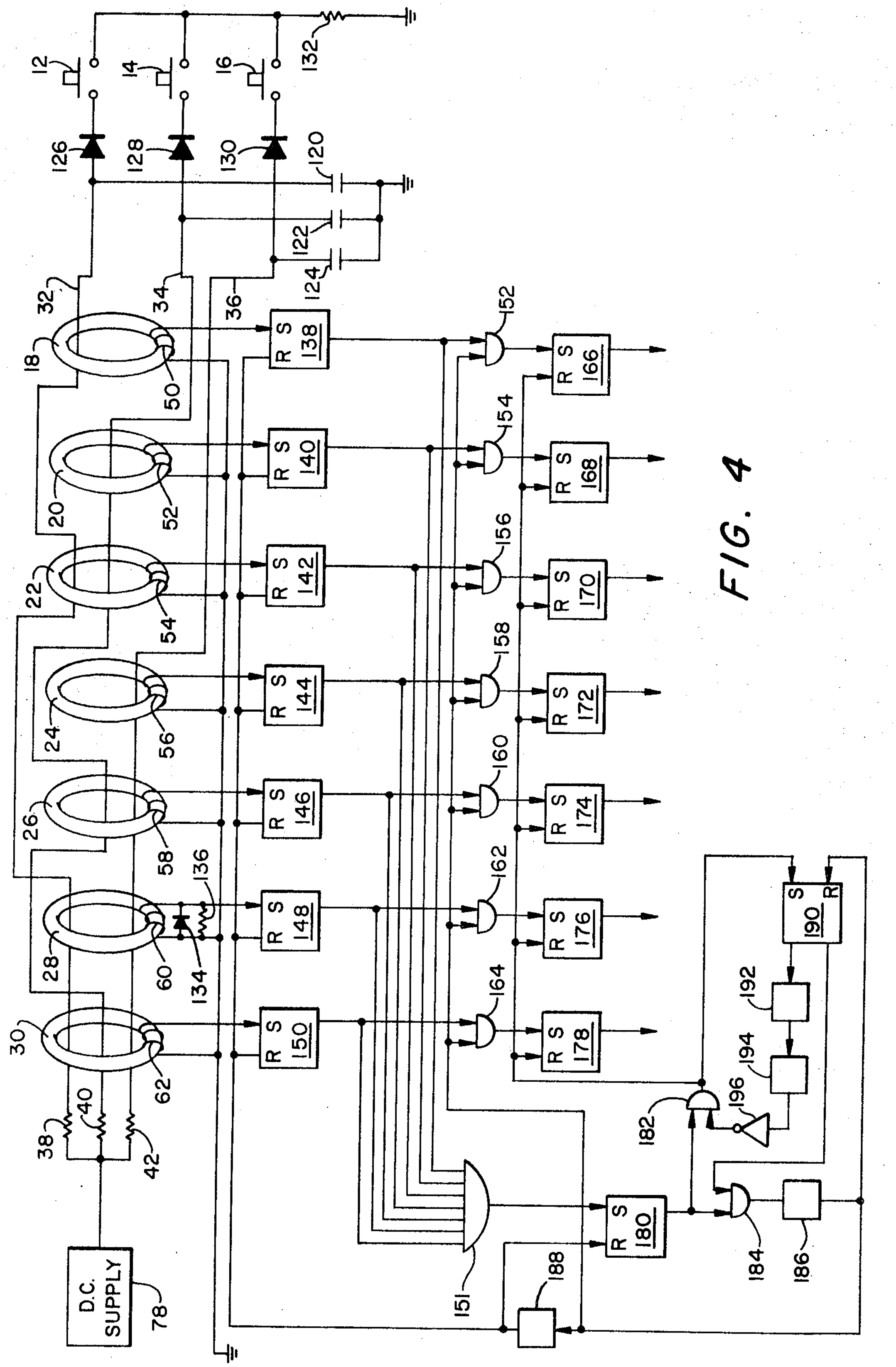
FIG. 4 is an alternative embodiment of a system similar to that of FIG. 2 and implementing an N-key rollover feature.

In FIG. 4, a keyboard having an N-key rollover feature is illustrated and is basically a variation of the system of FIG. 2, like numerals being used to denote like parts. The device however, is somewhat simplified in that it is not necessary to use any cores to detect the contemporaneous depression of any two or more of the keys of the keyboard. Hence, core 30 in essence serves as an encoding core.

The device of FIG. 4 employs charge storage means, preferably a capacitor, associated with each key, to store energy which is discharged and passed as a pulse through the ring core transformers when the switch is depressed. To this end, steady state DC supply 78 is connected through resistors 38, 40 and 42 to respective lines 32, 34 and 36, and the latter are in turn respectively connected each to one side of a corresponding storage capacitor 120, 122 and 124. The other sides of the latter capacitors are grounded. Lines 32, 34 and 36 are also each respectively connected to an anode of corresponding, noise-reducing diode 126, 128 and 130. The cathodes of diodes 126, 128 and 130 are respectively connected to an input terminal of corresponding one of key switches 12, 14 and 16. The other terminal of the latter switches are connected through resistor 132 to ground. The latter resistor is employed to slow down the discharge rate and to limit the current flow through the contacts of switches 12, 14 and 16.

In the preferred embodiment, the material for the ring cores is chosen so that it exhibits a strong reduction of permeability on the upper end of a frequency response curve. For example, the material may be a ferrite sold by Indiana General Corporation, Keasbey, New Jersey under the trade designation "Ferramic 0–6," and in such case will exhibit a substantially linear (non-rectangular) hysteresis loop having a permeability which remains roughly constant up to about 500 KHz and then drops markedly at higher frequencies. The use of a core material of this type will advantageously provide a filtering action which eliminates or drastically attenuates the transmission of high frequency components (typically above 1 MHz) between the input primary winding and the output secondary winding of the cores.

Each capacitor will be charged while its associated switch is open. The closure of a switch results in discharging the associated capacitor by current flow along the associated line threaded through the various cores. In either this initial switch closure should produce an abrupt transition or wave front which can be differentiated by the involved cores to produce short duration pulses across the corresponding secondary windings. It is preferred that the capacitor network associated with each switch should have a time constant such that the initial switch closure provides the desired high speed transition and the release of the switch initiates a relatively low speed return of the capacitor to its initial state. Where, as shown in FIG. 4, it is intended to discharge the capacitors by switch closure and charge them on switch opening, in order to eliminate transients due to switch bounce it is preferred that the time constant of the capacitor network associated with each switch be adjusted so that the capacitor has a fast discharge and slow charge capability. A resistor 136 is used as a load across each of the secondary windings, and a corresponding diode 134 is disposed to clamp the voltage across each secondary winding at ground. For simplification in the drawings only one such arrangement of diode 134 and resistor 136 is shown in connection with secondary winding 60. It will however, be appreciated that a similar diode resistor combination should be placed across each secondary winding.

One side of the output of each of the secondary windings 50, 52, 54, 56, 58, 60 and 62 in FIG. 4 is connected to ground and the other side of each of the windings is connected to a set input terminal of a bistable device such as corresponding flip-flops 138, 140, 142, 144, 146, 148 and 150. Each of the latter bistable devices is preferably a latching type flip-flop which will change state in response to a very short duration pulse at its set input and which will retain that state until cleared by a signal at its reset input. It will be appreciated that flip-flops 138 to 150 can be considered a buffer or first register. A like output terminal of each of flip-flops 138 to 150 inclusive is connected to a corresponding input of OR gate 151 and is also connected to an input terminal of a corresponding one of AND gates 152, 154, 156, 158, 160, 162 and 164. The output of the latter AND gates are connected to corresponding set input terminals of of flip-flops 166, 168, 170, 172, 174, 176 and 178. These latter flip-flops can be considered to constitute a second data storage device or register.

The embodiment of FIG. 4 also includes a "data present" flip-flop 180, the set terminal of which is connected to the output of OR gate 151. One output of flip-flop 180 is connected to a corresponding input terminal of first AND gate 182 and a corresponding input terminal of second AND gate 184. The output of gate 184 is connected to the input of first delay device 186. The output of the latter is connected in common to all of the enabling input terminals of AND gates 152, 154, 158, 160, 162 and 164. The output of delay device 186 is also connected to the input of second delay device 188. The output of the latter is connected to the reset input terminals of "data present" flip-flop 180 and also to all of the reset input terminals of flip-flops 138, 140, 142, 144, 146, 148 and 150.

The device also includes control flip-flop 190 having its set input terminal connected to the output of gate 182 and its reset input terminal connected to the output from delay device 186. One output of second control flop-flop 190 is connected to an enabling input terminal of gate 184. The other or complementary output terminal of flip-flop 190 is connected through series-coupled delay devices 192 and 194 and inverter 196 to an enabling input terminal of gate 182. The output of the latter is also connected in common to all of the reset input terminals of flip-flops 166, 168, 170, 172, 174, 176 and 178.

In operation, for example we can assume that line 32 has been activated by closure of switch 12. The closure of the switch, as shown in FIG. 5A, is illustrated as a wave form due to the depression and release of switch 12 and includes, in exaggerated form, a number of intermediate brief switch openings and closures simulating switch bounce.

It will be seen in wave form 5B, that the voltage across capacitor 120 initially drops from some valve, e.g. from five volts to zero, upon initial switch closure. Each time the switch opens momentarily as it bounces, the capacitor starts a slow charge, shown as a number of corresponding small peaks. When the switch finally reopens upon release, the slow (relative to the speed of discharge) charge then commences and ceases when capacitor 120 is again fully charged.

Figure 5:
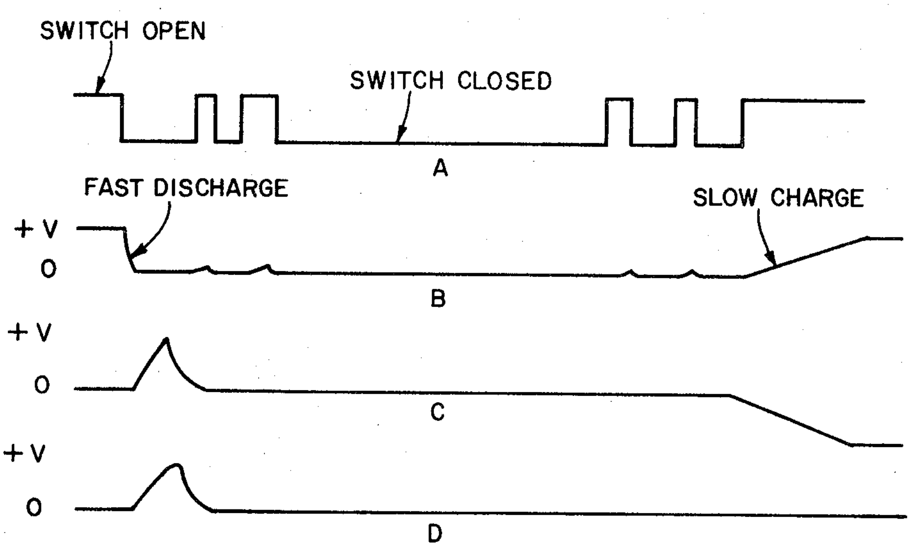
FIG. 5 is timing diagram showing some exemplary idealized waveforms all on a common time base illustrating the operations of the embodiment of FIG. 4.

The discharge of capacitor 120 through cores 18, 22, 28 and 30 creates a signal, shown in FIG. 5C, which consists primarily of a large fast spike due to the first fast discharge and a slow spike of opposite polarity due to the slow charge. Due to the attenuation of high frequency components in the core material and the small amplitude of the peaks created by the intermediate, very short charges and discharges occurring upon bounce, the latter are substantially eliminated from the wave form of the signal shown in FIG. 5C. Lastly, as shown in FIG. 5D, due to the clipping action of each of diodes 134 across its respective secondary winding, the spike due to the slow charge is eliminated from the signal which appears as the final output from the activated secondary windings.

The output spikes from the activated secondary windings each serves to set its respective one of flip-flops 138 to 150 inclusive, and the latter substantially serve as a memory or register for retaining information with respect to which of the particular cores has now been activated. The outputs from the set ones of flip-flops 138 to 150 are applied to OR gate 151, and the output of the latter sets flip-flop 180. The latter then serves as a memory to indicate that data is present or stored in the first register formed of flip-flops 138 to 150 inclusive.

It will be appreciated that flip-flop 180 is set almost immediately upon the initial discharge of capacitor 120. Hence, to introduce a delay to make certain that any spurious signals due to bounce are eliminated, the output of flip-flop 180 is applied through gate 184 (which is initially enabled) to delay device 186. The latter typically is a delay line or one-shot or the like which has a predetermined delay period designed into it. Typically, the delay provided by device 186 is in the order of 100 μsec. After the 100 μsec interval, the input signal from device 186 is applied to gates 152–164 inclusive to enable the latter and to permit the corresponding ones of flip-flops 166–178 to be set by those outputs of each of flip-flops 138–150 inclusive that are activated. The output of delay device 186 is also simultaneously applied to a second delay device 188 which introduces another delay, e.g. about 10 μsec. The output of second delay device 188 is then used to reset all of flip-flops 138–150 inclusive and to reset first control flip-flop 180.

Thus it will be seen that about 100 μsec after OR gate 151 sets flip-flop 180 to indicate that data is in the first register, that data are transferred to a second register formed of flip-flops 166 to 178 inclusive. 10 μsec after the data have been transferred from the first register to the second register, all of the flip-flops of the first register are reset so that the first register is now cleared for the next data word and flip-flop 180 reverts to its original state, corresponding to an empty first register.

However, in order to provide a strobe signal (which can inform the equipment which the keyboard may be operating or feeding, that the second register now contains data,) the output of delay device 186 resets second control flip-flop 190. This serves to provide a pair of complementary output signals indicating if data are present in the second register. One of these output signals is sent through series delay devices 192 and 194 (which may be a single delay device if desired). Preferably, the delay provided by device 192 is sufficient to permit the data to settle in the second register, and the delay provided by delay device 194 is sufficient to provide an adequate period of time to permit the data in a second register to be transferred out. Typically, these delays are respectively in the order of 100 μsec and 1 millisecond respectively. The output of delay 194, as inverted by inverter 196, is then applied to the enabling input terminal of AND gate 182. Where the signal from flip-flop 180 is at a level indicative that new data are in the first register, and an inverted signal is applied from the output of inverter 196 indicating transfer of the first character then gate 182 will provide an output signal which resets all of flip-flops 166–178 or clears the second register. Transfer of information out of the second register then must occur at least during the delay interval provided by device 194. The other of the complementary output signals from flip-flop 190 simultaneously serves to disable gate 184. When however, after the delay provided by devices 192 and 194, the first character has already been transferred, and the second character is in the first register. Hence, gate 182 will be open to enable the immediate transfer of the second character into the second register.

It will be seen that the use of the two registers results in extremely fast and unambiguous transfer of information, far in excess of the ordinary manipulative finger speed on a key switch. If two or more switches should be contemporaneously depressed, it will be apparent that the coded information provided by the switch which is first depressed, will be stored in latching flip-flops 138–150 and that subsequently coded information will not interfere with that storage. However, the information is transferred out of first register very quickly and the first register is cleared (as noted typically within a matter of about 100 μsec). The first register is then available to store the information provided by switch subsequently depressed, even if the second switch is operated only about 100 μsec following depression of the first switch. It will be apparent that, for example, all three switches can be sequentially depressed within, for example one millisecond after one another and yet the coded information will be accurately transmitted.

The features provided by the embodiment of FIG. 4 are based upon the fact that the input information to the first storage register is in the form of very short duration pulses, typically of a few microseconds or less duration so that although a key may remain depressed due for example, to mechanical inertia, it will not continue to activate its corresponding ring core transformers. There are other advantages to the embodiment of FIG. 4 in that current drain is minimal since there is no large steady state current drain on the power supply when a switch is closed. For example, if the keyboard is made of low-power integrated circuitry, the current required to service the circuits is believed to be in the order of 100 to 120 ma. and the keyboard can readily be operated from a portable power source such as a battery. In the device of FIG. 4, no oscillator is required as is the case in the device of FIG. 1, thus further reducing complexity and cost. Lastly, most of the components used, such as charging resistors, capacitors, cores and the like do not have critical values and hence wide variations in tolerances are readily accepted.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A keyboard entry device comprising, in combination charge storage means;

a substantially constant current course for charging said charge storage means;

a plurality of transformer cores;

a plurality of electrically conductive lines, each being threaded through a unique combination of one or more of said cores;

a plurality of switching means each for connecting said charge storage means to a corresponding one of said conductive lines so as to pass a current pulse between said one line and said charge storage means;

a plurality of secondary windings, each disposed about a corresponding one of said cores for providing an output signal;

a first register for storing said output signals from said secondary windings;

a second register;

gating means for selectively coupling said first and second registers;

means for detecting the presence of a said output signal at any of said secondary windings;

means for providing an enabling signal to said gating means a first predetermined time interval after detection of the presence of any said output signal;

means for clearing said first register a second predetermined time interval after said enabling signal is provided;

control means for detecting the presence of any said output signal and the resulting enabling signal;

means for providing a disabling signal to said means for providing said enabling signal a third predetermined time interval after detection of said output signal by said control means; and, means for clearing said second register after at least a fourth predetermined time interval after detection of the presence of the previous output signal.

2. A keyboard entry device as defined in claim 1 wherein said charge storage means comprises a plurality of capacitive means, each associated with a respective one of said conductive means.

3. A keyboard entry device as defined in claim 2 wherein said current source is connected to said capacitors for charging the latter while the corresponding said switching means are open.

4. A keyboard entry device as defined in claim 2 wherein each of said capacitive means has associated therewith a comparatively short discharge time constant and a comparatively long charging time constant.

5. A keyboard entry device as defined in claim 1 wherein said cores are formed of a material in which the magnetic permeability is substantially reduced at frequencies above about 1 MHz.

6. In a keyboard entry device of the type having means for producing a current, a plurality of encoding elements, a plurality of primary electrically conductive lines each being connected to a unique combination of one or more of said encoding elements, a plurality of switching means each for connecting said means for producing a current to a corresponding one of said primary conductive lines so as to pass a current pulse over said one of said primary lines, a plurality of secondary electrically conductive lines each connected to a corresponding one of said encoding elements for providing an output signal, a first register for storing said output signals from said secondary lines, a second register, gating means for selectively coupling said first and second registers; the improvement comprising;

means for detecting the presence of a said output signal at any of said secondary lines;

means for providing an enabling signal to said grating means a first predetermined time interval after detection of the presence of any said output signal;

means for clearing said first register a second predetermined time interval after said enabling signal is provided;

control means for detecting the presence of the any said output signal and the resulting enabling signal;

means for providing a disabling signal to said means for providing said enabling signal for a third predetermined time interval after detection of said output signal by said control means; and means for clearing said second register after at least a fourth predetermined time interval after detection of the presence of the previous output signal.

* * * * *